Feb. 21, 1961          D. KOSSEL         2,972,691
PHOTOCATHODE FOR PHOTOCELLS, PHOTOELECTRIC
QUADRUPLER AND THE LIKE
Filed July 22, 1953
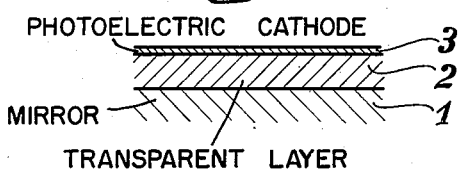
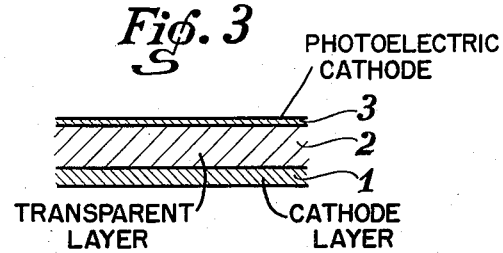
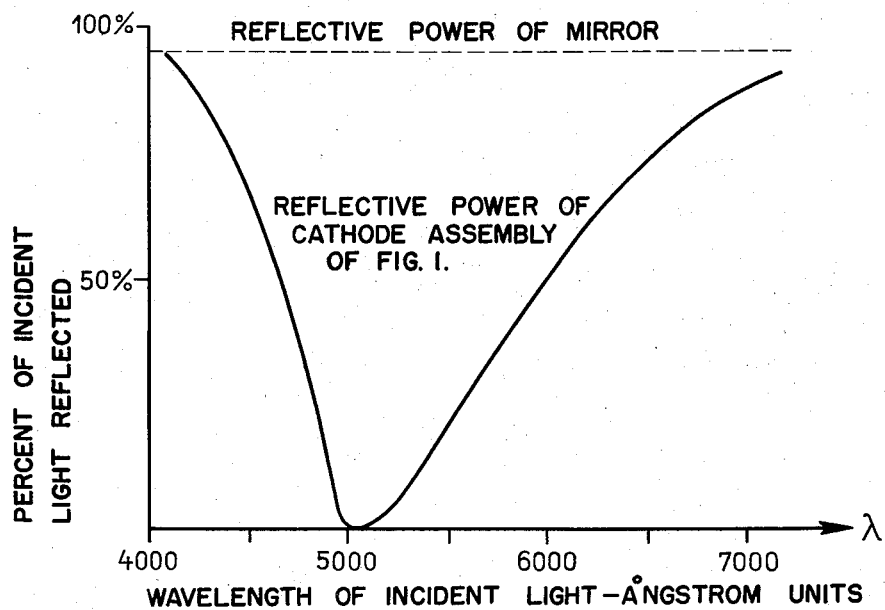
INVENTOR.
Dierich Kossel
BY Benj. T. Rauber
his attorney

United States Patent Office 2,972,691
Patented Feb. 21, 1961

2,972,691

PHOTOCATHODE FOR PHOTOCELLS, PHOTO-ELECTRIC QUADRUPLER AND THE LIKE

Dierick Kossel, Wetzlar (Lahn), Germany, assignor to Ernst Leitz, G.m.b.H., Wetzlar (Lahn), Germany, a corporation of Germany Filed July 22, 1953, Ser. No. 369,606

Claims priority, application Germany Aug. 6, 1952

6 Claims. (Cl. 313—94)

My invention relates to a photocathode for photocells, photoelectric quadruplers, supericonoscopes and similar apparatus.

It is known that very poor efficiencies of photocathodes may be improved by a skillful choice of the cathode material. For this it matters essentially to keep the release and discharge energies of the electrons as small as possible. Moreover the U.S. Patent 2,506,625 discloses that to increase the efficiency of photocathodes, the photoelectric layer is to be placed on a correspondingly shaped quartz rod or prism in order that by the use of total reflection the highest possible absorption of the incident light through the photoelectric layer may be obtained.

Since the year 1890 the research of Wiener has proven the existence of standing light waves. These experiments have later been repeated with the application of a photoelectric layer in place of the photographic layer which Wiener used. (H. E. Ives and T. C. Fry, J. Opt. Soc. Am. 23, 1933, page 73; Jäger, Ann. d. Physik, 34, 1939, page 280; Thorwart, Optik, 3, 1948, page 260).

Applying these researches and the well known laws of reflection, my invention increases the efficiency of photocathodes by forming the cathodes in interference mirrors. (Colloques Internationaux du Centre National de la Recherche Scientifique, XXIII, Les Proprietes Optiques des Lames Minces Solides, Paris, 1950, page 103 ff.)

In my invention a partly transparent cathode layer is placed in advance of a highly reflecting mirror with a spacing of $$(2n+1)\frac{\lambda}{4} \pm \alpha$$

where $n \pm 0, 1, 2, \ldots$, $\lambda =$ the wave length of light, and $\alpha =$ a correction factor which depends on the material selected. It is suitable for this purpose to arrange on the highly reflecting mirror in known manner a transparent intermediate layer of the thickness described above which carries on its exposed face the partly transparent cathode layer, whereby the thickness and the optical properties of the cathode layer are so determined that the system, mirror+intermediate layer+cathode layer, has a minimum reflection power for any definite, selected wave length of light. A further improvement is obtained by covering both sides of a transparent intermediate layer of a thickness of $$(2n+1)\frac{\lambda}{4} \pm \alpha$$

with a photoelectric cathode layer in which at least one cathode is partly transparent.

The invention is illustrated by way of example in the accompanying drawings in which, Fig. 1 is a section greatly magnified of the photocathode assembly, Fig. 2 is a diagram showing the reflecting power for different wave lengths of light of the photocathode assembly, Fig. 3 is a section similar to that of Fig. 1 of a photocathode assembly with two photoelectric cathode layers.

In the assembly of Fig. 1, a highly reflecting mirror 1 carries an intermediate layer 2 which carries on its exposed side a photoelectric cathode layer 3.

Fig. 2 shows the reflecting power of a typical assembly illustrated in Fig. 1 for various wave lengths of incident light, the reflective power of the assembly being shown by the full line curve as percentages of the incident light reflected, while that of the highly reflecting mirror is shown as the broken line slightly below the 100% mark on the ordinate, the abscissa showing the wave lengths of incident light in Angstrom units. With an assembly having a different thickness for the intermediate layer, the point of minimum reflection, and of maximum absorption, may, of course, be at a different point on the abscissa.

In the assembly of Fig. 3 the mirror 1 is replaced by a cathode layer.

The super-posing of the intermediate layer 2 on the highly reflecting mirror 1 may be accomplished in known manner by chemical or physical means. Similarly the photoelectric layer 3, which may consist of known photocathode material may be vaporized or sublimed onto the intermediate layer and finally activated.

The intermediate layer 2 may be of an electric conductive material such as indium oxide ($In_2O_3$) or tin oxide ($SnO_2$).

For example the mirror 1 may be a silver mirror on which is evaporated a cryolite layer of a thickness of 175° Angstrom units as an intermediate layer 2 and thereon an activated silver layer of a thickness of 200 Angstrom units as a cathode layer 3.

The photoelectric assembly of the example has its maximum absorption at the point having a thickness of 5780 Angstrom units wave length of incident light.

The thickness of the layers or otherwise the value of the factor $\delta$ may be computed by the methods of C. Dufour, D. Malé or F. Scandone described in detail in the said Colloques Internationaux du Centre National de la Recherche Scientifique, XXIII, Les Propriétés Optiques des Lames Minces Solides, Paris, 1950, page 23 ff.

Having described my invention, what I claim is:

1. A photocathode system which comprises a partly transparent photoelectric layer and a reflecting backing spaced from said photoelectric layer a distance equal to $$(2n+1)\frac{\lambda}{4} \pm \alpha$$

in which $n$ is a small integer including 0, $\lambda$ is the wave length of a selected light and $\alpha$ is a correction factor depending on the material in the space between the cathode layer and the backing and in which the thickness of the photoelectric layer is sufficient that the system has substantially no reflecting power for a definite selected wave length of light.

2. The photocathode system of claim 1 in which said reflecting backing is a highly reflecting mirror.

3. The photocathode system of claim 1 in which the reflecting backing is a photoelectric cathode layer.

4. The photocathode system of claim 1 in which an intermediate, transparent layer is placed between the photocathode layer and the backing.

5. An interference mirror comprising a highly reflecting backing, a transparent layer on said backing of a thickness of $$(2n+1)\frac{\lambda}{4} \pm \alpha$$

in which $n$ is a small integer including 0, $\lambda$ is the wave length of light and $\alpha$ is a correction factor depending on the material of the transparent layer, and a photoelectric layer on the free surface of said transparent layer, the thickness of said photoelectric layer being sufficient that the system has substantially no reflective power for a definite selected wave length of light.

6. The photocathode system of claim 1 in which said space is filled with an electric conductive material.

References Cited in the file of this patent

UNITED STATES PATENTS

| | | |
|---|---|---|
| 1,969,558 | Ives | Aug. 7, 1934 |
| 2,200,285 | Lorenzen | May 14, 1940 |
| 2,233,786 | Law | Mar. 4, 1941 |
| 2,252,770 | Janes | Aug. 19, 1941 |
| 2,394,533 | Colbert et al. | Feb. 12, 1946 |
| 2,519,722 | Turner | Aug. 22, 1950 |
| 2,566,349 | Mager | Sept. 4, 1951 |
| 2,590,906 | Tripp | Apr. 1, 1952 |
| 2,654,853 | Weimer | Oct. 6, 1953 |